United States Patent Office 3,784,703
Patented Jan. 8, 1974

3,784,703
METHOD OF TREATING HYPERTENSION
Clement A. Stone, Blue Bell, Pa., assignor to
Merck & Co., Inc., Rahway, N.J.
No Drawing. Continuation of abandoned application Ser.
No. 89,104, Nov. 12, 1970. This application Feb. 29,
1972, Ser. No. 230,534
Int. Cl. A61u 27/00
U.S. Cl. 424—317                                   9 Claims

ABSTRACT OF THE DISCLOSURE

A method of treating hyptertension in an animal by administering to the animal L-dopa or its salts in conjunction with L-α-hydrazino-α-lower alkyl-3,4-dihydroxyphenylpropionic acid or α-hydrazino-3,4-dihydroxyphenylpropionic acid, the esters of each compound and the pharmaceutically acceptable non-toxic salts thereof.

This is a continuation of Ser. No. 89,104, filed Nov. 12, 1970, now abandoned.

The present invention relates to a novel and useful method for the treatment of hypertension (high blood pressure). More particularly, it relates to a method of treating hypertension in an animal which comprises administering to the animal L-dopa or its salts in combination with hydrazine compounds.

It is known in the art that hypertension is a disease which is being encountered in medical practice in increasing frequency. Many drugs are known which will help alleviate the symptoms of hypertensions such as diuretics, L-α-methyldopa, tranquilizers and the like. In many instances, however, the hypertensive patient has a chronic condition which requires extended treatment over the lifetime of the patient. With the extended treatment the medical practitioner frequently finds that the patient will develop either a sensitivity or a tolerance to the drug which in many instances requires the discontinuance of treatment. Quite obviously, if alternate drugs were available, they would receive acceptance in the field of hypertension.

It is an object of the present invention to provide a method of treatment of treating hypertension. Another object is to provide a method for lowering blood pressure by the use of relatively non-toxic materials. A still further object is to provide alternative drugs for the treatment of hypertension when a patient develops a sensitivity or tolerance to currently used hypertension drugs. Other objects will become apparent as the description of the invention proceeds.

These objects are accomplished by the present invention which provides a method of treating hypertension in an animal which comprises administering to the animal a compound (A) selected from the group consisting of L-dopa and the pharmaceutically acceptable salts thereof in combination with a compound (B) selected from the group consisting of L-α-hydrazino-α-lower alkyl-3,4-dihydroxyphenylpropionic acid and α-hydrazino-3,4-dihydroxyphenylpropionic acid, the esters of each compound and the pharmaceutically acceptable non-toxic salts thereof.

The L-dopa employed in the present invention has the structural formula

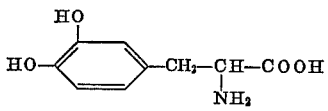

Since L-dopa has asymmetric carbon atoms, it exists as a racemic mixture and contains both the D and the L stereoisomers. In the present invention the L stereoisomer is employed since it is most probable that it constitutes the only active stereoisomer of the racemate. Of course, minor amounts of the D stereoisomer may be present since it does not interfere with the action of the L compound.

In a preferred embodiment of the present invention the L-dopa is employed in combination with α-hydrazino-α-substituted-3,4-dihydroxyphenylpropionic acid or its esters, wherein the substituent is H or lower alkyl, or its pharmaceutically acceptable salts. Such compounds are described in U.S. Pat. 3,462,536 and have the following structural formula

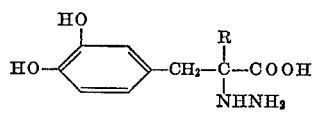

wherein R is H or lower alkyl.

In a still more preferred embodiment of the present invention, the hydrazine compounds are administered parenterally or orally even though they may also be administered rectally as suppositories or topically with penetrants. Preferably, the drugs are administered sequentially with the α-hydrazino-α-substitued-3,4-dihydroxyphenylpropionic acid compounds being given a few minutes to about 5 hours prior to the administration of L-dopa. As a practical matter, however, the drugs are generally given simultaneously in a single pill or capsule. The combination is usually given in amounts of from about 1 to about 500 mg./kg. of body weight with the ratio of L-dopa to the hydrazine compound being from about 0.1 to about 25, preferably about 0.5 to about 6 with about 1 to about 5 being the optimum ratio (weight basis).

In a preferred embodiment of the present invention, the hydrazine compound is L-α-hydrazino-α-methyl-3,4-dihydroxyphenylpropionic acid or α-hydrazino-3,4-dihydroxyphenylpropionic acid. With the latter compound either the D or L isomers may be used as well as the racemate since both compounds are active. With the former compound, only the L isomer of the compound is active. The same is also true for the esters of each of the compounds. While any esters can be employed such as the benzyl ester, methyl ester, ethyl ester, dodecyl ester, the lower alkyl esters are preferred.

The pharmaceutically acceptable salts of the drugs which may be used include, without limitation, the alkali metal and ammonium salts of the carboxy function and the hydrochloride, hydrobromide, sulfate and the like salts of the amino function. The term "lower alkyl" means an alkyl group containing from 1 to about 4 carbon atoms. In one of the preferred embodiments of the present invention, the free base compounds are used and not the salts.

The invention will now be described by reference to the following examples in which all parts are expressed in parts by weight unless otherwise indicated.

EXAMPLES

The tests are carried out on mongrel dogs of both sexes weighing 7 to 11 kilograms and all animals are anesthetized with vinbarbitol, 50 mg./kg. i.v. Systolic and diastolic arterial blood pressures are measured by means of a catheter placed in the femoral artery and then attached to a Statham transducer which itself was attached to a Sanborn 150 polygraph recorder. The test compounds are dissolved in 1.0 N HCl and the solution is then brought to 0.1 N HCl with physiological saline. The test compounds are administered in solution via the femoral vein (2 minutes infusion). Recordings are made at 1, 5, 15, 30, 60 and 120 minutes after giving the test compounds. When using the hydrazine compounds, these compounds are administered five minutes prior to the administration of L-dopa. The results are given in the following:

TABLE

Effect of L-dopa alone and in combination with hydrazine compounds on the arterial pressure of anesthetized dogs

| Example | Treatment | Dose, mg./kg. i.v. | No. of animals | Control values | Minutes after drug | | | | | |
|---|---|---|---|---|---|---|---|---|---|---|
| | | | | | 1 | 5 | 15 | 30 | 60 | 120 |
| 1 | Control (acidic saline) | | 5 | 155 | 157 | 158 | 154 | 155 | 154 | 143 |
| 2 | L-dopa | 10 | 7 | 115 | 111 | 121 | 126 | 117 | 115 | 119 |
| 3 | do | 25 | 5 | 148 | 131 | 166 | [2] 196 | 150 | 158 | 160 |
| 4 | do | 50 | 5 | 132 | 125 | [2] 198 | [2] 207 | 182 | 120 | 107 |
| 5 | Compound B | 15 | 4 | 127 | 127 | 127 | 127 | 125 | 125 | 122 |
| 6 | Compound B plus L-dopa | 15+25 | 7 | 145 | 135 | 126 | [2] 85 | [2] 85 | [2] 96 | [2] 109 |
| 7 | do | 15+50 | 5 | 109 | 99 | 81 | [2] 72 | [2] 69 | [2] 67 | [2] 76 |

[1] Average values for the given number of animals.
[2] Significantly different from control value; $p<0.05$.

NOTE.—Compound B is L-α-hydrazino-α-methyl-β-(3,4-dihydroxyphenyl)propionic acid.

EXAMPLE 8

When the above procedure is repeated employing the D, the L or the racemate of α-hydrazino-3,4-dihydroxyphenylpropionic acid, substantially the same results are obtained. The activity of both the D and L enantiomorphs are substantially equal so that either enantiomorph or the racemate may be used.

EXAMPLE 9

When the procedure of Example 6 is repeated employing the ethyl and dodecyl esters of Compound (B), substantially the same results are obtained.

As shown by Example 1, the control acidic saline solution has essentially no effect on blood pressure. As shown by Example 5, the hydrazine compound has essentially no effect on the blood pressure. As shown by Examples 2 to 4, L-dopa actually elevates the blood pressure during the initial timing period. As shown by Examples 6 and 7, the combination of the hydrazine compounds and L-dopa substantially lowers blood pressure. Since one of the compounds by itself has no effect on blood pressure and the other compound by itself elevates blood pressure, it is quite surprising that the two compounds together would lower blood pressure.

While in the above examples only the use of L-dopa in combination with hydrazine compounds has been shown, it should be noted that the compounds would generally be utilized with other drugs such as diuretics, and the like to help alleviate the symptoms of hypertension.

Many other equivalant modifications of the invention would be apparent to those skilled in the art from a reading of the foregoing without a departure from the inventive concept.

What is claimed is:

1. A method of treating hypertension in an animal which comprises administering to the animal a therapeutically effective amount of a compound (A) selected from the group consisting of L-dopa and a pharmaceutically acceptable salt thereof in combination with a compound (B) selected from the group consisting of L-α-hydrazino-α-lower alkyl-3,4-dihydroxyphenylpropionic acid and α-hydrazino-3,4-dihydroxyphenylpropionic acid, the benzyl and alkyl esters of each compound and a pharmaceutically acceptable non-toxic salt thereof wherein the ratio of compound (A) to compound (B) is from about 0.1 to about 25.

2. The method of claim 1 wherein the compound (B) is L-α-hydrazino-α-methyl-3,4-dihydroxyphenylpropionic acid.

3. The method of claim 1 wherein the compound (B) is racemic α-hydrazino-3,4-dihydroxyphenylpropionic acid.

4. The method of claim 1 wherein the compound (B) is L-α-hydrazino-3,4-dihydroxyphenylpropionic acid.

5. The method of claim 1 wherein the ratio of compound (A) to compound (B) is from about 0.5 to about 6.

6. The method of claim 1 wherein the ratio of compound (A) to compound (B) is about 1 to about 5.

7. The method of claim 1 wherein the compounds are administered orally.

8. The method of claim 1 wherein the compounds are administered sequentially.

9. The method of claim 1 wherein the compounds are administered simultaneously.

References Cited

UNITED STATES PATENTS 3,462,536    8/1969    Chenerda et al.    424—309
3,362,879    1/1968    Udenfriend et al.    424—319

OTHER REFERENCES

J. Pharm. Pharmac., 1970, 22, pp. 241–243.
J. Pharm. Pharmac., 1970, 22, pp. 553–560.

STANLEY J. FRIEDMAN, Primary Examiner

U.S. Cl. X.R.

424—309, 319